(12) United States Patent
Boren et al.

(10) Patent No.: US 7,717,520 B2
(45) Date of Patent: May 18, 2010

(54) AIRCRAFT PASSENGER SEAT CUSHIONS

(75) Inventors: Kelly L. Boren, Marysville, WA (US);
Rush F. Green, Seattle, WA (US); Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/749,770

(22) Filed: May 17, 2007

(65) Prior Publication Data
US 2008/0157583 A1 Jul. 3, 2008

Related U.S. Application Data

(60) Provisional application No. 60/882,747, filed on Dec. 29, 2006.

(51) Int. Cl.
*A47C 7/02* (2006.01)
*B60N 2/42* (2006.01)

(52) U.S. Cl. .............. 297/452.48; 297/216.1; 297/452.26

(58) Field of Classification Search ........... 297/216.1, 297/452.21, 452.26, 452.27, 452.42, 452.58, 297/DIG. 3, 452.41, 452.48; 5/652.1
See application file for complete search history.

(56) References Cited

U.S. PATENT DOCUMENTS

| | | | | | |
|---|---|---|---|---|---|
| 3,000,020 | A | * | 9/1961 | Lombard et al. | 5/653 |
| 3,362,032 | A | * | 1/1968 | Summers | 428/101 |
| 3,553,749 | A | * | 1/1971 | Majeske | 267/153 |
| 3,616,471 | A | | 11/1971 | Braun | |
| 3,762,766 | A | * | 10/1973 | Barecki et al. | 297/217.1 |
| 3,846,857 | A | | 11/1974 | Weinstock | |
| 4,031,579 | A | * | 6/1977 | Larned | 5/652.1 |
| 4,132,228 | A | | 1/1979 | Green | |
| 4,204,657 | A | * | 5/1980 | Graham | 244/122 R |
| 4,371,997 | A | * | 2/1983 | Mattson | 5/709 |
| 4,623,192 | A | * | 11/1986 | Koide et al. | 297/284.11 |
| 4,624,877 | A | | 11/1986 | Lea et al. | |
| 4,930,171 | A | * | 6/1990 | Frantz | 5/654 |
| 4,960,304 | A | * | 10/1990 | Frantz | 297/284.6 |

(Continued)

FOREIGN PATENT DOCUMENTS

WO 96/14783 5/1996

OTHER PUBLICATIONS

Rolf Loepfe, "Why pneumatic seats will be the standard in 10 years", http://www.lantal.com/data/LANT01/docs/93/Why%20pneumatic%20seats%20will%20be%20standard.pdf, Mar. 2004, Lantal Textiles, Langenthal, Switzerland.

(Continued)

*Primary Examiner*—Sarah B McPartlin
(74) *Attorney, Agent, or Firm*—Ostrager Chong Flaherty & Broitman P.C.

(57) ABSTRACT

An aircraft seat assembly configured in accordance with an example embodiment of the invention offers a light weight and comfortable seat cushioning system that also provides energy-absorption and enhanced passenger maneuverability in extreme conditions such as may be experienced in a hard landing situation. The cushioning system includes a crushable, energy-absorbing layer, a main cushioning layer, a smaller ishial insert layer which may be the same as the main cushioning material and a semi-dynamic pneumatic cell which uses a dual action breather valve to vary its inflation with changes in cabin pressure. The seat cushion may be finished with a covering of cloth or upholstery.

14 Claims, 6 Drawing Sheets

U.S. PATENT DOCUMENTS

| | | | |
|---|---|---|---|
| 5,121,962 A * | 6/1992 | Weber et al. ............... 297/214 |
| 5,144,705 A | 9/1992 | Rogers |
| 5,269,590 A * | 12/1993 | Carilli ................. 297/452.55 |
| 5,282,286 A | 2/1994 | MacLeish |
| 5,390,384 A * | 2/1995 | Dinsmoor et al. ............. 5/654 |
| 5,469,592 A | 11/1995 | Johnson |
| 5,558,398 A * | 9/1996 | Santos ................... 297/284.3 |
| 5,617,595 A * | 4/1997 | Landi et al. ................... 5/653 |
| 5,704,691 A * | 1/1998 | Olson .................. 297/452.55 |
| 5,722,729 A * | 3/1998 | Carilli ................. 297/452.55 |
| 6,241,320 B1 * | 6/2001 | Chew et al. ........... 297/452.26 |
| 6,598,250 B1 * | 7/2003 | Pekar .......................... 5/654 |
| 6,896,324 B1 * | 5/2005 | Kull et al. ............... 297/216.1 |
| 2003/0038402 A1 * | 2/2003 | Visconti et al. ............ 264/257 |

OTHER PUBLICATIONS

Lantal Textiles, "Recaro and Lantal Jointly Develop a Pneumatic Seat Cushion", http://www.aerospace-technology.com/contractors/interiors/lantal/press1.html, Apr. 29, 2004, Lantal Textiles.

Lantal Textiles, "Now Taking to the Air—Lantal's Innovative Pneumatic Seat Cushion for Aircraft Seats", http://www.aerospace-technology.com/contractors/interiors/lantal/press2.html, Jun. 21, 2005, Lantal Textiles.

U.S. Appl. No. 11/383,867, Not Yet Published.

* cited by examiner

AIRCRAFT PASSENGER SEAT CUSHIONS

CROSS-REFERENCE TO RELATED APPLICATION

This application claims the benefit of provisional U.S. application Ser. No. 60/882,747, filed Dec. 29, 2006.

TECHNICAL FIELD

Embodiments of the present invention relate generally to aircraft components. More particularly, the present invention relates to improvements in aircraft passenger seating cushions.

BACKGROUND

Commercial aircraft utilize a variety of passenger seating configurations and designs. Historically, aircraft passenger seats have been manufactured using heavy and bulky materials that satisfy certain structural design requirements and passenger comfort requirements. Such components can contribute a significant amount to the overall weight of an aircraft, particularly when the aircraft includes seats for hundreds of passengers. Weight reduction is becoming increasingly important in modern aircraft design. A reduction in the weight of the aircraft structure may allow the aircraft to carry more fuel, thus extending the flight range. A reduction in the weight of the aircraft structure may also allow the aircraft to carry additional passengers or cargo, thus increasing the potential profitability of the aircraft.

The amount of legroom and personal space in a commercial aircraft influences the overall comfort of the passenger. In practice, the bulky materials and thick padding utilized in conventional aircraft passenger seats consume precious cabin space that could otherwise be used for increased legroom or used for additional rows of seats. Such bulky materials are usually necessary for structural support and thick padding is often necessary to provide sufficient cushioning for the seated passengers.

Since modern commercial aircraft design places extreme importance on the benefits of lightweight components, design constraints are often placed upon other desirable features such as comfort and convenience. This is particularly apparent in aircraft seat design because the aircraft is typically configured with hundreds of such seats and customer comfort is of paramount concern. Conventional economy class seat cushion designs have relied almost completely on foamed rubber cushioning schemes which suffer from a variety of shortcomings, including compromises made between durability and comfort. In the seating scheme of a typical airplane, the thickness and density of the foams used in the cushion and backrest are carefully balanced between passenger comfort and the overall weight of the seat cushion.

Aircraft passenger seat cushion design can be improved in a variety ways depending upon which of several benefits are featured. One such improved design featuring substantial weight reduction in a composite assembly is disclosed in copending U.S. application Ser. No. 11/383,867, filed May 17, 2006 which is incorporated herein by reference.

Further improvements are possible in accordance with the present seat cushion design and these improvements can be readily incorporated in the aforementioned composite seat design, as well as other conventional seat designs. With the subject seat cushion design, even an economy class seat can be enhanced in terms of safety, comfort and weight. The present improved design also offers additional design choices to aircraft purchasers by improving this important aspect of seating design.

These improvements are achieved, in part, by utilizing a crushable, energy-absorbent element not heretofore utilized in a seat cushion assembly. This crushable element serves to improve passenger safety and maneuverability in hard landing scenarios. The energy-absorbent, crushable, enhanced maneuverability component is combined with the seat cushion assembly and serves to reduce the forces that may be transferred from a seat structure to the spine, pelvis and femur of the passenger, thereby enhancing the passenger's ability to rapidly exit the aircraft in some emergency situations.

It will be appreciated that the subject improved cushion design also achieves weight reduction, enhanced comfort and an improved margin of safety through its unique combination of cushioning and crushable elements.

Prior conventional seat design approaches, particularly for economy seating, attempted to improve seating cushions by combining different foam densities and types to specific regions of the cushion. The desire to relieve pressure and discomfort related to long term sitting is achieved by judicious selection of foam materials, but this alone is insufficient to enhance safety and maneuverability in a hard landing situation.

Varying the variety and quantity of foam cushioning materials can yield improvements in comfort, but this will not necessarily furnish a meaningful or substantial weight savings. Furthermore, the reliance on foam as the sole supporting element of a relatively comfortable seat cushion generally means such foam will lack sufficient durability required for long in-service life and will offer little or no safety and maneuverability improvements.

Aircraft cushions heretofore have not had a specific component designed to crush under very specific and tightly controlled load conditions, thereby enhancing safety and maneuverability of passengers by absorbing sudden energy spikes and permanently crushing a portion of the seat cushion under emergency situations. This crushing mechanism minimizes the transfer of large energy spikes to the legs, pelvis and spine of a seated passenger, greatly enhancing the ability for rapid emergency egress.

Thus, the new cushion design maintains and improves current comfort levels and meets all anthropometric seating requirements while reducing the overall weight of the seating system and improving safety.

Accordingly, it is desirable to provide an improved passenger seat cushion for aircraft applications. In addition, it is desirable to have a passenger seat cushion design having an improved combination of comfort and safety features. Other desirable features and characteristics of embodiments of the present invention will become apparent from the following descriptions and the appended claims, taken in conjunction with the accompanying drawings and the foregoing technical field and background.

BRIEF SUMMARY

An aircraft seat cushioning system, combining comfort, durability as well as passenger maneuverability under extreme conditions is provided by means of a new aircraft seat cushion. The constituent elements of the subject seat cushion may be effectively combined in a number of configurations. For example, a typical seat cushion configuration has a first or bottom layer of energy absorbing material; a next layer of cushioning foam which is considered the main cushioning layer; and a further layer of cushioning foam for comforting the Ischia and which is called an ischial insert. Generally, the ischial insert is placed atop the main cushioning foam and it may be made of the same or different cushioning material. In a first embodiment, the energy-absorbing layer, the main cushioning foam layer and the ischial insert of cushioning foam are all encapsulated in a sealable semi-dynamic pneumatic cell which contains the foregoing components and is capable of inflating and deflating with changes in cabin pressure. The foregoing cushion assembly may be completed with a finishing covering of fabric or upholstery which is typically used to cover the entire cushion.

The main cushioning foam is selected from among conventional comfort foams, memory foams, low density foams and similar cushioning materials. As is well known, these are varied and selected to combine an optimum combination of comfort, durability and weight savings as may be desired in a specified seating design. These materials are generally rubber or plastic foams including polyurethane. Non-foam cushions may be utilized but are less preferred choices.

The ischial insert is used to provide additional comfort to the passenger's large lower pelvic bones. The ischial insert is also made of cushioning foam and may be the same as or different from the foam utilized as the main cushioning layer.

The energy-absorbing material may be selected from among plastic and curable resinous materials which may be fabricated into crushable panels which absorb and deflect energy spikes under extreme forces and conditions. Such crushable panels may have a honeycomb structure as is readily fabricated from phenolic resin or it may have the expanded foam structure of polystyrene foam board. It is also contemplated that crushable, energy-absorbent gas-filled film materials may be utilized, an example of which is Bubble Wrap® brand cushioning from Sealed Air Corporation.

The semi-dynamic pneumatic cell is a partially inflatable plastic or rubber cell which has a gas-tight seal along its edges and additionally has a two-way or dual action reciprocating breather valve for adjusting inflation and deflation of the cell as it experiences aircraft cabin pressure changes. Such dual action breather valves are available from Halkey-Roberts Co. A particularly useful material for fabricating the semi-dynamic pneumatic cell is polyurethane sheet which posses a good degree of sealability as well as durability in an aircraft seat cushion.

In an alternative embodiment of the present design an aircraft seat cushioning system will comprise the foregoing cushioning and energy-absorbing elements which are stacked in a cushioning array with the semi-dynamic pneumatic cell as a separate layer, rather than having the cushioning elements sealed within the pneumatic cell. In a configuration of this type, there may be a bottom layer or pad of energy absorbing material; a next layer of main cushioning foam; an ischial insert of cushioning foam placed atop the main cushioning foam; and an upper layer semi-dynamic pneumatic cell placed atop the other elements. The same component materials may be utilized as described above for the earlier described embodiment and the cushion may be finished with a full or partial covering of fabric or upholstery.

The above described aircraft seat cushioning system provides new aircraft seat assemblies, particularly those including modern light weight composite seat assemblies. Such an aircraft seat assembly will generally comprise a lightweight composite support structure having an upper end; a lightweight composite seat base having an upper side, a lower side, and a rear section, the lower side being coupled to the upper end of the lightweight composite support structure; the above-described aircraft seat cushioning system positioned on the upper side of the lightweight composite seat base; a seat back frame coupled to the rear section of the lightweight composite seat base; and a seat back cushion coupled to the seat back frame.

BRIEF DESCRIPTION OF THE DRAWINGS

A more complete understanding of the present invention may be had by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments.

As used herein, unless expressly stated otherwise, "connected", "coupled" or "attached" mean that one element or feature is directly or indirectly joined to or communicates with another element or feature, and not necessarily mechanically.

The cushion seat system is comprised of multiple layers and materials that collectively act as a self-inflating or semi-dynamic pneumatic cushioning system. The bottom layer is made of crushable, energy-absorbing material such as a lightweight polystyrene foam, resin or composite honeycomb structures used in aerospace applications or bubble cell material with a thickness of about 0.25 to 1.0 in. The next layer is the main foam layer or pad such as comfort foam, memory foam, or foam of low density with a relative thickness of about 0.25 to 2.0 in. Non-foam cushions are less preferred. A smaller ischial insert is typically utilized in combination with the main cushioning layer, it may be made of the same material or even molded into the main cushion. In one embodiment, the semi-dynamic pneumatic cell encapsulates the cushioning foam layer and the crushable element. The preferred sealed pneumatic cell will be an abrasion and puncture resistant elastomer such as polyurethane plastic having a thickness of about 0.005 to 0.06 in. Contained within the cushion's cell in this embodiment are the main foamed rubber layer or a new non-foam material, the ischial insert, and the crushable element. Because the cushion is sealed and the pneumatic aspect is controlled by a dual action breather valve, optimal cushion inflation is maintained across a broad spectrum of elevation and cabin pressure scenarios without any additional mechanical systems or pumps.

The seat cushion is typically covered with or is bonded to a finished fabric cover or upholstery which adds about 0.125 to 0.5 in. to the overall thickness of the total pneumatic cushion. The finishing covering may be full or partial, and may hold the other components with a zipper, elastic, hook with loop fasteners, or the like.

Figure 1:
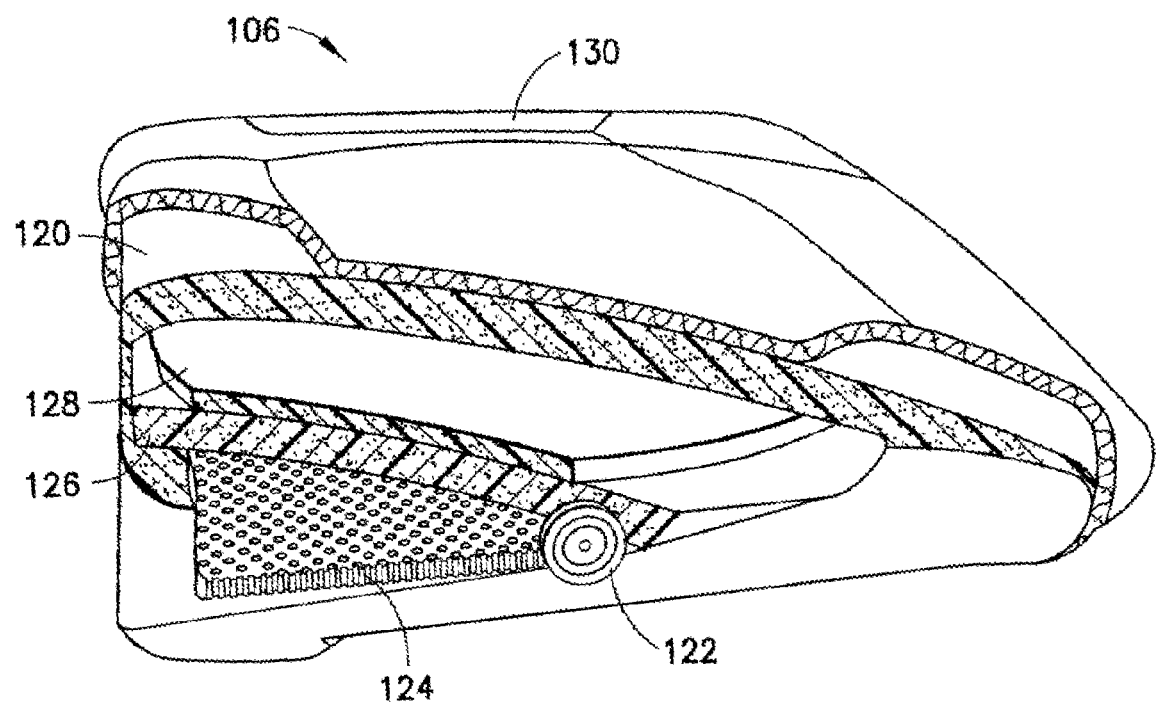
FIG. 1 is a side perspective cutaway detail of the seat cushion configured in accordance with an example embodiment of the invention.

FIG. 1 is a perspective cutaway view depicting one embodiment of seat cushion 106 wherein the cushioning elements are contained within the self-inflating pneumatic cell. This view depicts honeycomb lattice 124 as the crushable, energy absorbing element, main foam cushion element 126, and ischial insert 128, all installed within self-inflating pneumatic cell 120. Also shown is two-way breather valve 122 for maintaining and adjusting cell pressure, and upholstery cushion covering 130 enclosing the cushion system.

Figure 2:
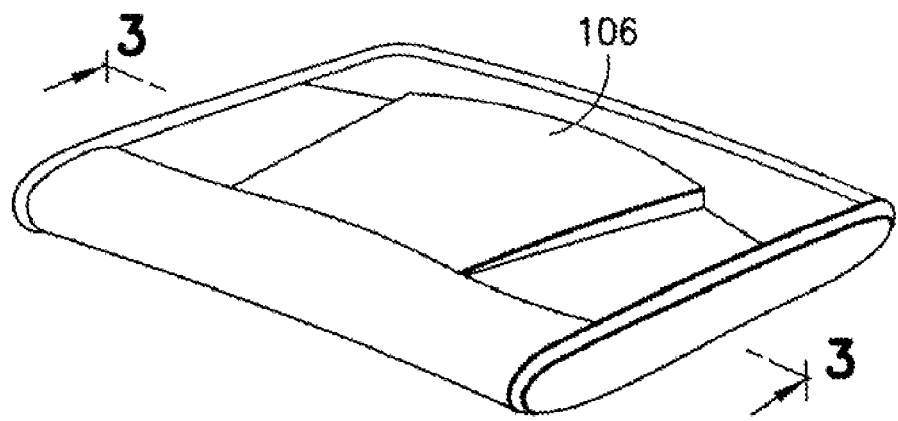
FIG. 2 is a front perspective view of an aircraft seat cushion for use in the seat assembly of FIG. 5.
Figure 5:
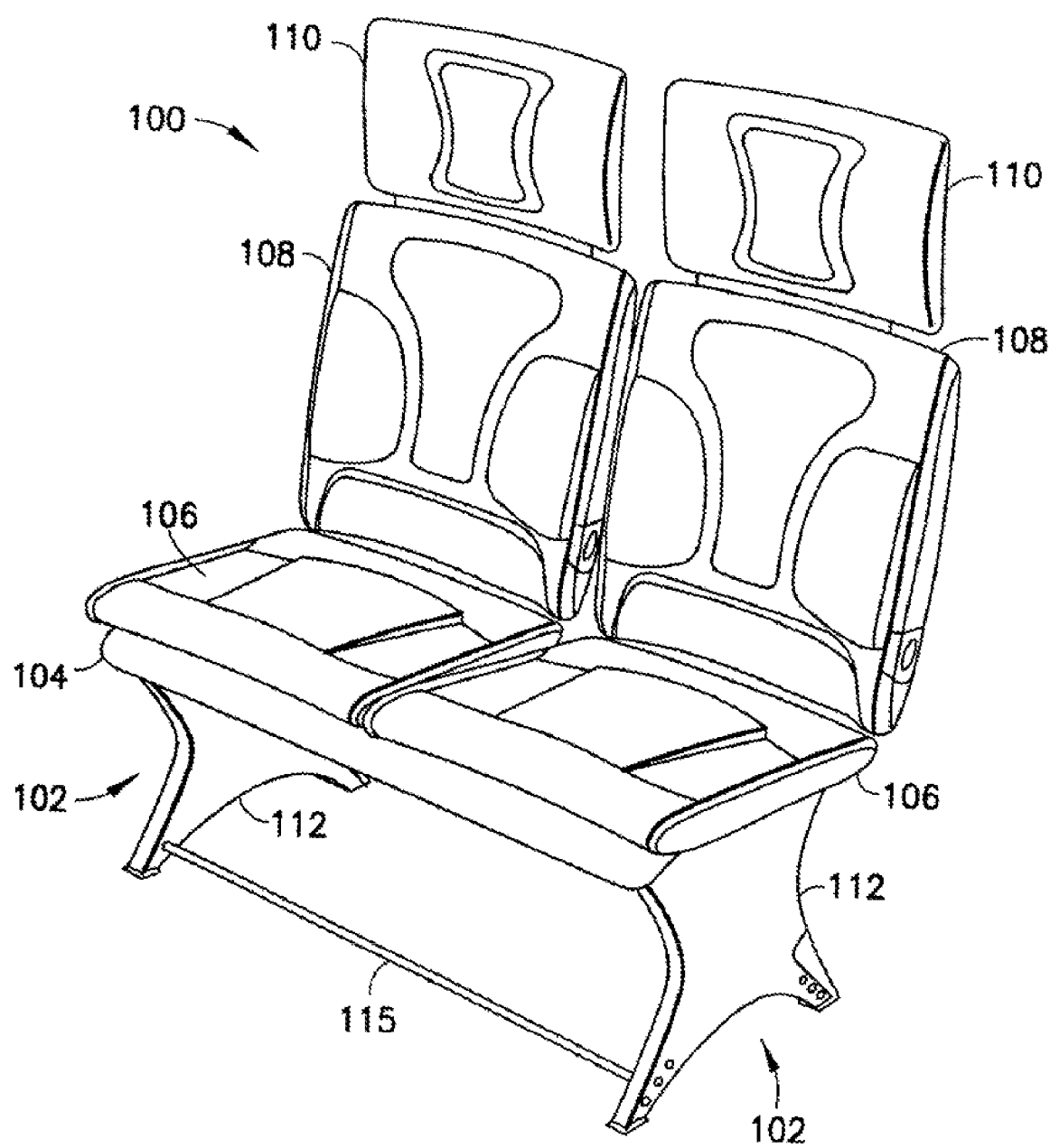
FIG. 5 is a front perspective view of a double seat assembly for an aircraft configured in accordance with an example embodiment of the invention.

FIG. 2 depicts seat cushion 106 of the present invention before it is installed in an aircraft seat assembly such as double seat assembly 100 seen in FIG. 5. In this embodiment, seat cushion is shown finished with a contoured surface which may be varied for aesthetics or comfort.

Figure 3:
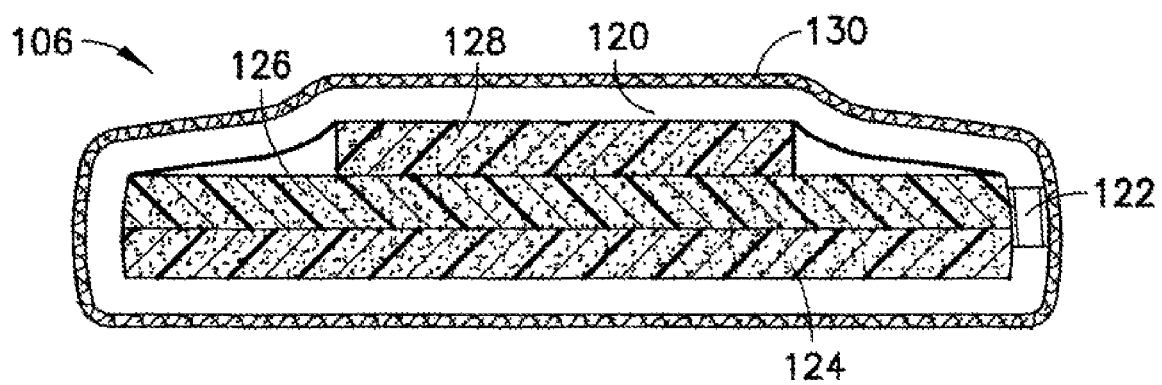
FIG. 3 is cross-section of the seat cushion depicted in FIG. 2 at reference line 3-3.

FIG. 3 depicts a cross-section of seat cushion 106 taken at view reference line 3-3 in FIG. 2. In this embodiment, cushioning and energy absorbent elements are deployed within a self-inflating cushioning pneumatic bladder. Crushable, energy absorbing pad 124, such as a honeycomb lattice, supports main cushioning foam element 126 and ischial element 128. These cushioning elements may be conventional cushion materials such as foam rubber padding or newer style memory foam cushioning components. The main cushion 126 may be the same of different material than the ischial element 128. The foregoing cushioning and energy absorbing elements are deployed within sealed self-inflating pneumatic cell 120 which is preferably a sealable rubber or plastic cell such as polyurethane. The self-inflating mechanism operates through two-way inflation valve 122 which is installed through the thickness of pneumatic cell 120. A preferred inflation valve 122 is a dual action breather valve available from Halkey-Roberts such as its model C990HBV breather valve.

Figure 4:
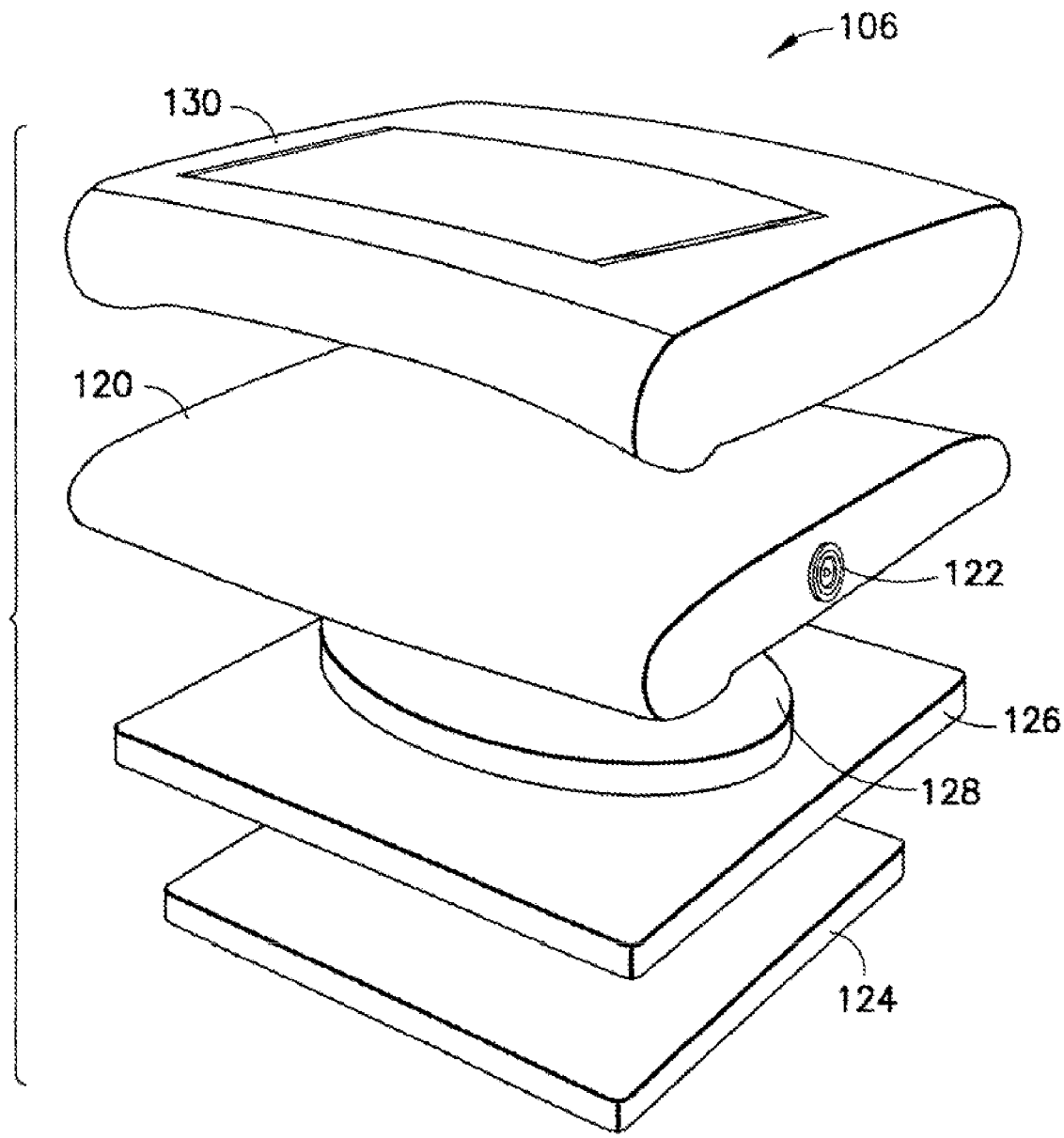
FIG. 4 is an exploded detail perspective view of the seat cushion configured in accordance with an example embodiment of the invention.

FIG. 4 is perspective view of seat cushion 106 shown in exploded detail. Ischial insert 128 is placed upon main cushioning layer 126 which is placed upon crushable energy absorbent layer 124. These components may be made of the same materials used in the above-described seat cushion embodiments. In alternative embodiments, the foregoing cushioning elements are installed within or below self-inflating pneumatic cell 120. The semi-dynamic pneumatic cell 120 is shown above the cushioning elements in this view. Self-inflating pneumatic cell 120 operates with two-way or dual action reciprocating breather valve 122 which is sealed in a side wall of the pneumatic cell. Cushion finishing covering 130, which is typically upholstery, covers and contains all of the foregoing elements.

FIG. 5 is a front perspective view of a double seat assembly 100 configured in accordance with an example embodiment of the invention. These seat assemblies are suitable for use as passenger seats in an aircraft, e.g., a row of seats in a commercial aircraft. Example embodiments of the invention may also be deployed as a single or triple seat assembly (not shown), or any number of seat assemblies configured to accommodate a specified number of passengers, limited only by practical size restrictions, structural material properties, and aircraft configuration. The double seat configuration depicted in FIG. 5 is not intended to limit or otherwise restrict the application or scope of the invention in any way.

In a preferred embodiment, double seat assembly 100 generally includes a lightweight composite support structure 102, a lightweight composite seat base 104 sized to accommodate two passengers, two improved energy absorbent seat cushions 106, two seat back arrangements 108, and two headrests 110. The combination of these main components results in a lightweight and compact aircraft seat assembly.

Seat cushions 106, as described above in connection with FIGS. 1-4, are positioned in FIG. 5 on upper side 116 of lightweight composite seat base 104. Double seat assembly 100 may utilize individual and physically distinct seat cushions 106 or a subassembly that includes seat cushions 106 coupled together. For example, seat cushions 106 may be joined together via a suitably configured webbing, seam, or connecting material.

The seat cushion may also include a fabric or upholstered cover or casing surrounding the cushion components. Because the seat cushion is designed such that it self-inflates when the aircraft cabin is pressurized, it provides additional air cushioning for the passenger during flight. When the aircraft is grounded, however, the seat cushion deflates such that remaining cushioning materials provide most, if not all, of the cushioning for the passenger.

Self-inflating, semi-dynamic pneumatic cell 120 is formed from any material that can accommodate repeated inflations and deflations and can withstand passenger loading. In the example embodiment, semi-dynamic pneumatic cell 120 is formed from a resilient and flexible thermoplastic elastomer, such as a polyurethane material. The gas within semi-dynamic pneumatic cell 120 is usually cabin air. In operation, using two-way inflating valve 122, the gas and semi-dynamic pneumatic cell 120 react to external air pressure conditions to provide increased cushioning for aircraft cabin pressurization conditions.

A combination of the cushioning materials and the ischial insert bears the passenger load when the aircraft cabin is not pressurized. Cushioning material may be, for example, a foam material having a desired density. The self-inflating characteristic of the present seat cushion extends the life of the cushioning material and enables the use of lower density and co-molded densities or lower thickness foams that will provide improved comfort compared to current cushions for taxi, take-off, and landing scenarios. The semi-dynamic pneumatic cell 120 bears the passenger load and provides enhanced comfort during flight compared to conventional cushion technologies. Cushion designs will vary in size to accommodate seating designs. For typical economy class seating, such a cushion might be about 17-19 in. wide by 15 to 18 in. deep and 1.5 to 3.0 in. in thickness.

Figure 6:
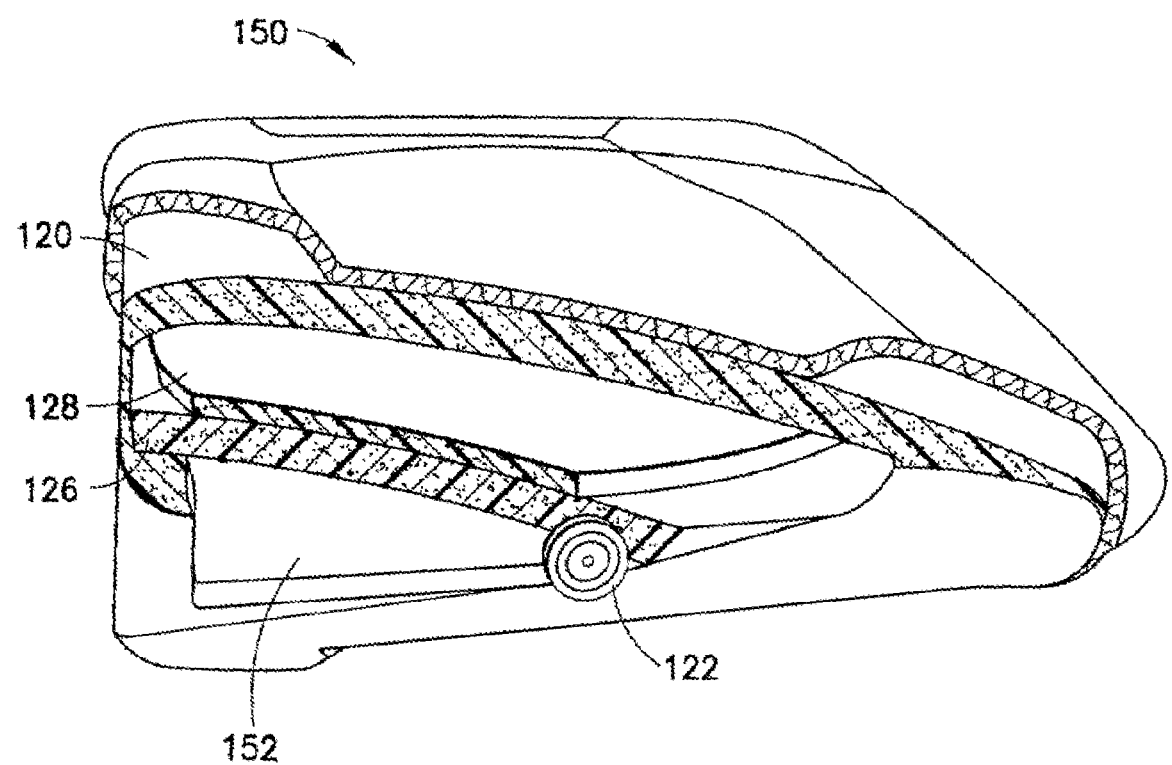
FIG. 6 is a side perspective cutaway detail of the seat cushion configured in accordance with an alternative example embodiment of the invention.

FIG. 6 is a perspective cutaway view depicting seat cushion 150 which is an alternative embodiment of the present invention. This view depicts expanded polystyrene foam board 152 as the crushable, energy-absorbing element. In this embodiment, the polystyrene foam board 150 is combined with main foam cushion element 126, and ischial insert 128. Again, these three cushioning elements are installed within self-inflating pneumatic cell 120. Also shown is two-way breather valve 122 and upholstery cushion covering 130.

Figure 7:
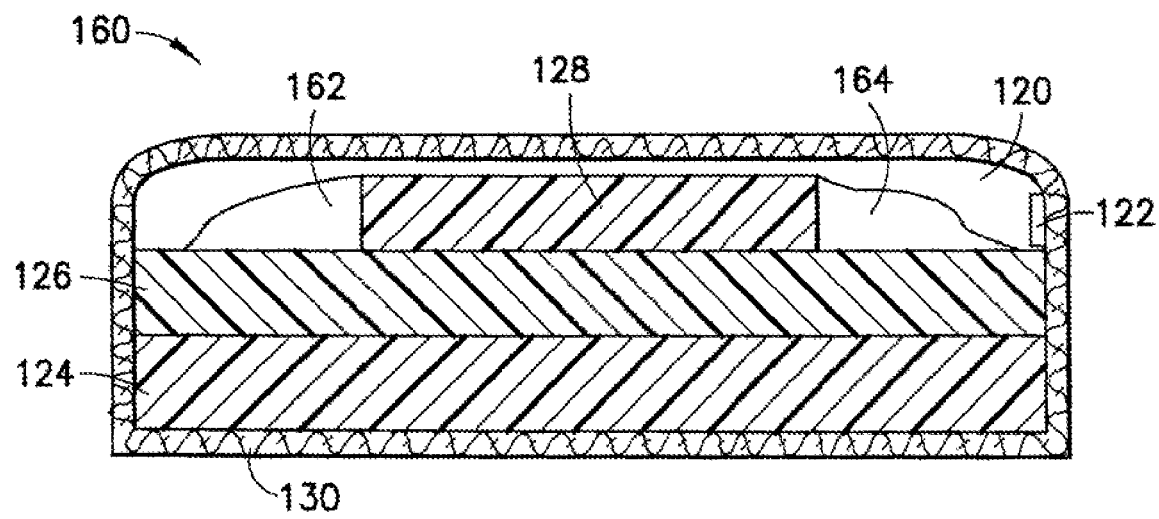
FIG. 7 is a cross-section of a further alternative embodiment of the seat cushion design.

FIG. 7 is a cross-sectional detail of another alternative construction of the subject seat cushion. In this embodiment, the layers of energy-absorbing material and the cushioning layers are arrayed in a stack beneath the semi-dynamic pneumatic cell instead of being sealed therein. In FIG. 7, seat cushion 160 has a crushable, energy absorbing layer 124 supporting main cushioning foam element 126 and ischial element 128. These cushioning elements may be conventional cushion materials described above. The main cushion 126 may be the same or different material than the ischial element 128. Self-inflating, semi-dynamic pneumatic cell 120 has a two-way inflation valve 122 which is installed through the thickness of a wall in pneumatic cell 120 and which operates the self-inflating mechanism. In this figure, pneumatic cell 120 is depressurized and voids 162 and 164 will be filled by expansion of the pneumatic cell. In this embodiment the cushion is finished with fabric or upholstery covering 130.

In the first embodiment described above, it is seen that the semi-dynamic pneumatic cell contains within the cell the energy absorbing crushable element, the main cushioning element as well as the ischial insert. This design offers the manufacturer the ability to provide a completely integrated seat cushion unit, readily interchangeable as needed for wear or repair.

In the alternative embodiment described in connection with FIG. 7, the semi-dynamic pneumatic cell can be utilized as an empty cell, excepting only the cushioning gas contained therein. In such instance, the pneumatic cell may be placed atop a stack of the remaining seat cushion components, all of which may be contained in a fabric or upholstery covering. Thus the cushioning elements may build up from the seat base with the crushable energy-absorbing element as the bottom layer, followed by the main cushioning material and the ischial insert, then finally the semi-dynamic pneumatic cell closest to the passenger for maximum comfort.

As mentioned, the preferred crushable layer is fabricated from aerospace grades of honeycomb structures such as Hex-Web® honeycomb available from Hexcel Corp. Another source is Aircell. Preferred honeycomb cores will be made of Nomex resin or phenolic resin but other choices are available to the designer. Preferred honeycomb cores will have cell sizes of about 0.125 to 0.25 in.

Thus, the above-described cushion system provides increased comfort through the use of new combinations of thinner and lighter cushioning and energy-absorbent materials, thus reducing the amount of foam needed for the cushion, reducing the need for heavier and more durable densities of foam, and reducing the overall cushion thickness allowing for more leg room and under seat storage.

These cushioning materials, coupled with the benefit of the semi-dynamic pneumatic cell cushioning system allow for a reduction of shear forces between the cushion and the body and reduce the building up of pressure on the ischial tuberositi while a passenger is seated for the duration of a flight. Lastly, the new design functions as an energy absorber in emergency situations and delivers increased safety to the passenger in the event of a hard landing scenario. Both the dual action breather valve and the insertion of a crushable element to the bottom of the cushion let large spikes of energy be absorbed by the cushion during emergency situations reducing forces delivered to the lower body over current designs and reducing the chance of leg, pelvic and spinal fractures that could prevent or delay emergency egress.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way.

The invention claimed is:

1. An energy-absorbent encapsulated and crushable aircraft seat cushioning system comprising:
   a. a permanently crushable insert providing a bottom layer of energy absorbing material effective for absorbing sudden energy spikes and thereby reducing forces transferred from an aircraft seat structure to a passenger and enhancing the passenger's ability for rapid egress of the aircraft;
   b. a next layer of main cushioning foam;
   c. an ischial insert of cushioning foam placed atop the main cushioning foam;
   d. a semi-dynamic and self-inflatable pneumatic cell encapsulating the energy absorbing layer, the main cushioning foam layer and the ischial insert of cushioning foam, wherein the semi-dynamic pneumatic cell is a sealable bladder which is automatically adjustable in accordance with changes in aircraft cabin pressure, the cell having a two-way dual action reciprocating breather valve effective for maintaining and adjusting inflation of the cell when the aircraft is pressurized and deflation of the cell when the aircraft is grounded; and
   e. a finishing fabric or upholstery covering the seat cushioning elements.

2. A seat cushioning system as in claim 1 wherein the main cushioning foam is selected from comfort foams, or memory foams, or low density foams.

3. A seat cushioning system as in claim 1 wherein the ischial insert of cushioning foam is selected from comfort foams, or memory foams, or low density foams.

4. A seat cushioning system as in claim 1 wherein the crushable insert is energy absorbing material selected from resin or composite honeycomb panels, expanded polystyrene foam board and energy-absorbent gas-filled cushioning film cell inserts.

5. A seat cushioning system as in claim 4 wherein the energy absorbing crushable insert is a phenolic resin honeycomb panel.

6. A seat cushioning system as in claim 1 wherein the semi-dynamic pneumatic cell is a polyurethane cell.

7. A seat cushioning system as in claim 1 further comprising an aircraft seat assembly having a lightweight composite support structure and seat base wherein the energy-absorbent aircraft seat cushioning system seat cushion is positioned on the upper side of the seat base; a seat back frame coupled to the rear section of the seat base; and a seat back cushion coupled to the seat back frame.

8. An energy-absorbent and crushable aircraft seat cushioning system comprising:
   a. a permanently crushable insert providing a bottom layer of energy absorbing material effective for absorbing sudden energy spikes and thereby reducing forces transferred from an aircraft seat structure to a passenger and enhancing the passenger's ability for rapid egress of the aircraft;
   b. a next layer of main cushioning foam;
   c. an ischial insert of cushioning foam placed atop the main cushioning foam;
   d. an upper layer of a semi-dynamic and self-inflating pneumatic cell placed atop the energy absorbing layer, main cushioning layer and ischial insert, wherein the semi-dynamic pneumatic cell is a sealable bladder which is automatically adjustable in accordance with changes in aircraft cabin pressure, the cell having a two-way dual action reciprocating breather valve effective for maintaining and adjusting inflation and deflation of the cell when the aircraft is pressurized and deflation of the cell when the aircraft is grounded; and
   e. a finishing fabric or upholstery covering the seat cushioning elements.

9. A seat cushioning system as in claim 8 wherein the main cushioning foam is selected from comfort foams, or memory foams, or low density foams.

10. A seat cushioning system as in claim 8 wherein the ischial insert of cushioning foam is selected from comfort foams, or memory foams, or low density foams.

11. A seat cushioning system as in claim 8 wherein the crushable insert is selected from resin or composite honeycomb panels, expanded polystyrene foam board and energy-absorbent gas-filled cushioning film cell inserts.

12. A seat cushioning system as in claim 11 wherein the energy absorbing crushable insert is a phenolic resin honeycomb panel.

13. A seat cushioning system as in claim 8 wherein the semi-dynamic pneumatic cell is a polyurethane cell.

14. A seat cushioning system as in claim 8 further comprising an aircraft seat assembly having a lightweight composite support structure and seat base wherein the energy-absorbent aircraft seat cushioning system seat cushion is positioned on the upper side of the seat base; a seat back frame coupled to the rear section of the seat base; and a seat back cushion coupled to the seat back frame.

* * * * *